US009432583B2

(12) United States Patent
Niemi

(10) Patent No.: US 9,432,583 B2
(45) Date of Patent: Aug. 30, 2016

(54) METHOD OF PROVIDING AN ADJUSTED DIGITAL IMAGE REPRESENTATION OF A VIEW, AND AN APPARATUS

(75) Inventor: Sami Niemi, Skanor (SE)

(73) Assignee: Mobile Imaging in Sweden AB, Lund (SE)

( * ) Notice: Subject to any disclaimer, the term of this patent is extended or adjusted under 35 U.S.C. 154(b) by 56 days.

(21) Appl. No.: 14/233,053

(22) PCT Filed: Jun. 20, 2012

(86) PCT No.: PCT/SE2012/050688
§ 371 (c)(1),
(2), (4) Date: May 27, 2014

(87) PCT Pub. No.: WO2013/012370
PCT Pub. Date: Jan. 24, 2013

(65) Prior Publication Data
US 2014/0293113 A1    Oct. 2, 2014

(30) Foreign Application Priority Data
Jul. 15, 2011  (SE) .................................... 1150711

(51) Int. Cl.
*H04N 5/232* (2006.01)
*H04N 5/235* (2006.01)
*H04N 1/60* (2006.01)

(52) U.S. Cl.
CPC ......... *H04N 5/23293* (2013.01); *H04N 5/2356* (2013.01); *H04N 1/6013* (2013.01)

(58) Field of Classification Search
CPC ............ H04N 5/23293; H04N 5/2356; H04N 5/23216
See application file for complete search history.

(56) References Cited

U.S. PATENT DOCUMENTS 6,075,905 A    6/2000 Herman et al.
6,105,045 A    8/2000 Kurabayashi et al.
(Continued)

FOREIGN PATENT DOCUMENTS

EP    1 613 060 A1    1/2006
EP     1942401 A1    7/2008
(Continued)

OTHER PUBLICATIONS

International Type Search Report and Written Opinion for Application No. ITS/SE10/00290 dated May 2, 2011.
(Continued)

*Primary Examiner* — Ahmed A Berhan
(74) *Attorney, Agent, or Firm* — Alston & Bird LLP

(57) ABSTRACT

According to one aspect of the inventive concept there is provided a method of providing an adjusted digital image representation of a view, the method comprising providing a set of images, wherein the images of said set depict a same view and are captured with a digital camera using different configurations of the digital camera; determining an initial representation of the view by providing a primary image based on image data of at least a first image of said set; sending the primary image for presentation of the initial representation on a display; providing a secondary image based on image data of at least a second image of said set, wherein the first image and the second image are different images; and sending, in response to receiving a user command, the secondary image for presentation of an adjusted representation of the view on the display.

22 Claims, 5 Drawing Sheets

(56) References Cited

U.S. PATENT DOCUMENTS

| | | | |
|---|---|---|---|
| 6,529,627 | B1 | 3/2003 | Callari et al. |
| 6,542,645 | B1 | 4/2003 | Silverbrook et al. |
| 6,621,524 | B1 | 9/2003 | Iijima et al. |
| 6,724,386 | B2 | 4/2004 | Clavadetscher |
| 6,750,903 | B1 | 6/2004 | Miyatake et al. |
| 6,927,874 | B1 | 8/2005 | Enokida et al. |
| 6,975,352 | B2 | 12/2005 | Seeger et al. |
| 6,985,172 | B1 | 1/2006 | Rigney et al. |
| 7,099,510 | B2 | 8/2006 | Jones |
| 7,133,069 | B2 | 11/2006 | Wallach et al. |
| 7,133,169 | B2* | 11/2006 | Terashima ............... H04N 1/00 271/3.14 |
| 7,199,829 | B2* | 4/2007 | Matsui ................. H04N 1/6011 348/333.02 |
| 7,339,580 | B2 | 3/2008 | Westerman et al. |
| 7,508,438 | B2* | 3/2009 | Okamoto ............... H04N 5/232 348/222.1 |
| 7,659,923 | B1 | 2/2010 | Johnson |
| 7,787,664 | B2 | 8/2010 | Luo et al. |
| 8,127,232 | B2 | 2/2012 | Pavley et al. |
| 8,160,152 | B2 | 4/2012 | Murayama et al. |
| 8,463,020 | B1 | 6/2013 | Schuckmann et al. |
| 8,494,306 | B2 | 7/2013 | Sorek et al. |
| 8,497,920 | B2 | 7/2013 | Levoy et al. |
| 8,594,460 | B2 | 11/2013 | Lindskog et al. |
| 2001/0020978 | A1* | 9/2001 | Matsui ................. H04N 1/6011 348/222.1 |
| 2002/0159632 | A1 | 10/2002 | Chui et al. |
| 2003/0071908 | A1 | 4/2003 | Sannoh et al. |
| 2003/0147000 | A1 | 8/2003 | Shiraishi |
| 2003/0189647 | A1 | 10/2003 | Kang |
| 2003/0190090 | A1 | 10/2003 | Beeman et al. |
| 2004/0080661 | A1 | 4/2004 | Afsenius et al. |
| 2004/0165788 | A1 | 8/2004 | Perez et al. |
| 2004/0201699 | A1 | 10/2004 | Parulski et al. |
| 2004/0223649 | A1 | 11/2004 | Zacks et al. |
| 2005/0007483 | A1 | 1/2005 | Zimmermann et al. |
| 2005/0031214 | A1 | 2/2005 | Zhang et al. |
| 2005/0099514 | A1 | 5/2005 | Cozier et al. |
| 2005/0122412 | A1 | 6/2005 | Shirakawa et al. |
| 2006/0001650 | A1 | 1/2006 | Robbins et al. |
| 2006/0022961 | A1 | 2/2006 | Kaminaga |
| 2006/0028579 | A1 | 2/2006 | Sato |
| 2006/0038908 | A1 | 2/2006 | Yoshino |
| 2006/0044444 | A1* | 3/2006 | Okamoto ............... H04N 5/232 348/333.05 |
| 2006/0061845 | A1 | 3/2006 | Lin |
| 2006/0171687 | A1 | 8/2006 | Aiso |
| 2006/0181614 | A1 | 8/2006 | Yen et al. |
| 2006/0187321 | A1 | 8/2006 | Sakamoto |
| 2007/0024721 | A1 | 2/2007 | Rogers |
| 2007/0058064 | A1 | 3/2007 | Hara et al. |
| 2007/0097206 | A1 | 5/2007 | Houvener et al. |
| 2007/0237421 | A1 | 10/2007 | Luo et al. |
| 2007/0274563 | A1* | 11/2007 | Jung .................. H04N 1/00392 382/103 |
| 2008/0062141 | A1 | 3/2008 | Chandhri |
| 2008/0143744 | A1 | 6/2008 | Agarwala |
| 2008/0152258 | A1 | 6/2008 | Tulkki |
| 2008/0165141 | A1 | 7/2008 | Christie |
| 2008/0218611 | A1 | 9/2008 | Parulski et al. |
| 2008/0218613 | A1 | 9/2008 | Janson et al. |
| 2009/0019399 | A1 | 1/2009 | Matsunaga et al. |
| 2009/0046943 | A1 | 2/2009 | Ishiga |
| 2009/0073285 | A1 | 3/2009 | Terashima |
| 2009/0141046 | A1 | 6/2009 | Rathnam et al. |
| 2009/0190803 | A1 | 7/2009 | Neghina et al. |
| 2009/0204920 | A1 | 8/2009 | Beverley et al. |
| 2009/0244301 | A1 | 10/2009 | Border et al. |
| 2009/0245685 | A1 | 10/2009 | Makii |
| 2009/0251591 | A1 | 10/2009 | Whitham |
| 2009/0295830 | A1 | 12/2009 | Muraveynyk et al. |
| 2009/0303338 | A1 | 12/2009 | Chaurasia et al. |
| 2009/0309990 | A1 | 12/2009 | Levoy et al. |
| 2009/0322926 | A1 | 12/2009 | Ikeda et al. |
| 2010/0025123 | A1 | 2/2010 | Lee et al. |
| 2010/0045608 | A1 | 2/2010 | Lessing |
| 2010/0079498 | A1 | 4/2010 | Zaman et al. |
| 2010/0149367 | A1 | 6/2010 | Yim et al. |
| 2010/0268729 | A1 | 10/2010 | Nara et al. |
| 2011/0200259 | A1 | 8/2011 | Lindskog et al. |
| 2012/0262490 | A1 | 10/2012 | Niemi |
| 2014/0101590 | A1 | 4/2014 | Lindskob et al. |
| 2014/0177975 | A1 | 6/2014 | Lindskob et al. |
| 2014/0184852 | A1 | 7/2014 | Neimi |

FOREIGN PATENT DOCUMENTS

| | | |
|---|---|---|
| EP | 2 124 186 A1 | 11/2009 |
| EP | 2 175 635 A1 | 4/2010 |
| EP | 2 323 102 A1 | 5/2011 |
| JP | 2010 020581 A | 1/2010 |
| WO | WO 01/59709 A1 | 8/2001 |
| WO | WO 2004/068865 A1 | 8/2004 |
| WO | WO 2005/050567 A1 | 6/2005 |
| WO | WO 2007/006075 A1 | 1/2007 |
| WO | WO 2007/038198 A1 | 4/2007 |
| WO | WO 2008/038883 A1 | 4/2008 |
| WO | WO 2008/064349 A1 | 5/2008 |
| WO | WO 2009/156561 A1 | 12/2009 |
| WO | WO 2011/040864 A1 | 4/2011 |

OTHER PUBLICATIONS

International Search Report and Written Opinion for Application No. PCT/SE2012/050688 dated Oct. 26, 2012.
Peleg, S. et al., *Stereo Panorama With a Single Camera*, Proceedings of the 1999 IEEE Computer society conference on Computer Vision and Pattern Recognition, IEEE, vol. 1 (Jun. 1999) pp. 395-401.
Shum, H-Y. et al., *Rendering with Concentric Mosaics*, SIGGRAPH 99, ACM (1999) 299-306.
Farin, et al., *Shortest Circular Paths on Planar Graphs*, 27th Symposium on Information Theory in the Benelux (2006) pp. 117-124.
Itti, et al., *A Model of Saliency-based Visual Attention for Rapid Scene Analysis*, IEEE Transactions on Pattern Analysis and Machine Intelligence, vol. 20, No. 11 (1998) pp. 1254-1259.
Ling, H. et al., *Diffusion Distance for Histogram Comparison*, IEEE Computer Society Conference on Computer Vision and Pattern Recognition, (2006) 8 pages.
Jiebo Luo et al. *Highly Automated Image Recomposition: The Picture You Wish You Had Taken*, 2006 Western New York Image Processing Workshop, Sep. 29, 2006, Rochester Institute of Technology, Chester F. Carlson Center for Imaging Science Auditorium, Building 76, Rochester, NY 14623. Download from Internet http://citeseerx.ist.psu.edu/viewdoc/download?doi=10.1.1.102.8032&rep=rep1&type=pdf#page=27.
Matthews, K. E. et al., *Simultaneous Motion Parameter Estimation and Image Segmentation using the EM Algorithm*, Oct. 23-26, 1995, download from internet: http://ieeexplore.ieee.org/xpl/login.jsp?reload=true&tp=&arnumber=531423&url=http%3A%2F%2Fieeexplore.ieee.org%2Fxpls%2Fabs_all.jsp%3Farnumber%3D531423.
Ojala, T. et al., *Multiresolution Gray-Scale and Rotation Invariant Texture Classification With Local Binary Patterns*, IEEE Transactions on Pattern Analysis and Machine Intelligence, vol. 24, No. 7 (Jul. 2002) 971-987.
Oliva, A. et al., *Modeling the Shape of the Scene: A Holistic Representation of the Spatial Envelope*, International Journal of Computer Vision 42(3), x(2001) 145-175.
Aseem Agarwala, et al., *Interactive Digital Photomontage*, ACM Transactions on Graphics, Aug. 1, 2004, vol. 23, No. 3, pp. 294-302; ISSN: 0730-0301; XP-002359799; figure 1; abstract.
A.A.Isola, et al., *Motion compensated iterative reconstruction of a region of Interest in cardiac cone-beam CT*, Computerized Medical Imaging and Graphics, Mar. 1, 2010, vol. 34, No. 2, pp. 149-159, ISSN:0895-6111, abstract.
Shutao Li et al., *Multifocus Image Fusion Using Region Segmentation and Spatial Frequency*, ScienceDirect, Image and Vision Computing, vol. 26 (2008) pp. 971-979.

(56) References Cited

OTHER PUBLICATIONS

Wandell, B. et al., *Multiple Capture Single Image Architecture With a CMOS Sensor*, Proceedings of the International Symposium on Multispectral Imaging and Color Reproduction for Digital Archives (Society of Multispectral Imaging of Japan), (Oct. 21-22, 1999) 11-17.
Canon: "Powershot S95 Camera User Guide" [online] [retrieved Jun. 1, 2015]. Retrieved from the Internet: UR: http://gdlp01.c-wss.com/gds/4/0300003994/02/PSS95_CUG_EN_02.pdf>. (dated 2010) 196 pages.
International Search Report/Written Opinion for Application No. PCT/SE2010/051019 dated Jan. 21, 2011.
International Search Report: mailed Jul. 20, 2010; Search Request No. ITS/SE10/00034.
International Search Report/Written Opinion for Application No. PCT/SE2012/050584 dated Sep. 6, 2012.
Office Action for European Application No. 12 793 286.1 dated Oct. 2, 2014.
Supplementary European Search Report for Application No. EP 12 79 3286 dated Feb. 4, 2015.
Swedish Office Action dated Jul. 20, 2010; Ref: SE-21046020.
Office Action for European Application No. 11 15 3998 dated Mar. 9, 2015.
Office Action for U.S. Appl. No. 13/026,500 dated Jul. 31, 2012.
Office Action for U.S. Appl. No. 13/026,500 dated Jan. 2, 2013.
Notice of Allowance for U.S. Appl. No. 13/026,500 dated May 21, 2013.
Notice of Allowance for U.S. Appl. No. 13/026,500 dated Jul. 24, 2013.
Office Action for U.S. Appl. No. 13/499,711 dated Feb. 27, 2015.
Notice of Allowance for U.S. Appl. No. 14/037,563 dated Aug. 14, 2014.
Notice of Allowance for U.S. Appl. No. 14/037,563 dated Dec. 12, 2014.
Notice of Allowance for U.S. Appl. No. 14/037,563 dated Mar. 31, 2015.
Third-Party Submission for U.S. Appl. No. 14/037,708 dated Jun. 12, 2015.
Office Action for U.S. Appl. No. 14/118,493 dated Feb. 6, 2015.
Extended European Search Report for corresponding European Application No. 12814902.8 dated Jun. 1, 2015, 9 pages.
Office Action for Canadian Application No. 2,841,910 dated Apr. 17, 2015.
Notice of Allowance for U.S. Appl. No. 14/037,563 dated Jul. 20, 2015.
Office Action for U.S. Appl. No. 14/118,493 dated Aug. 4, 2015.
Extended European Search Report for corresponding European Application No. 11153998.7 Aug. 12, 2015, 9 pages.
Xiong, Y. et al., *Fast Panorama Stitching n Mobile Devices*, Consumer Electronics (ICCE), 2010 Digest of Technical Papers International Conference, (Jan. 2010) 319-320.
Office Action for U.S. Appl. No. 13/499,711 dated Oct. 5, 2015.
Office Action for U.S. Appl. No. 14/233,053 dated Sep. 11, 2015.
Atallah, M. J. et al., *An Optimal Algorithm for Shortest Paths on Weighted Interval and Circular-Arc Graphs, With Applications*, Algorithms ESA '93 Sep. 30, 1993 Springer, Berlin, Heidelberg, vol. 726, pp. 13-24.
Office Action for U.S. Appl. No. 14/037,708 dated Oct. 19, 2015.
Notice of Allowance for U.S. Appl. No. 14/118,493 dated Dec. 30, 2015.
Supplementary European Search Report for Application No. EP 10 82 0903 dated Dec. 18, 2015.
Office Action for U.S. Appl. No. 13/499,711 dated Mar. 31, 2016.
Notice of Allowance for U.S. Appl. No. 14/037,708 dated Mar. 22, 2016.
Notice of Allowance for U.S. Appl. No. 14/118,493 dated Jan. 21, 2016.
Office Action for European Application No. 12 793 286.1 dated Feb. 15, 2016.

* cited by examiner

METHOD OF PROVIDING AN ADJUSTED DIGITAL IMAGE REPRESENTATION OF A VIEW, AND AN APPARATUS

TECHNICAL FIELD

The present inventive concept relates to a method of providing an adjusted digital image representation of a view as well as an apparatus.

BACKGROUND

Due to the fast-paced development of consumer electronics in recent years, digital cameras are quickly becoming more and more capable. Modern digital cameras make it easy to capture a large number of images at each photo opportunity. A shooting opportunity may hence often result in several images of the same view, e.g. of the same object, the same person(s), the same animal(s), the same scenery, the same landscape, the same buildings etc. Some digital cameras even include built-in functionality for facilitating capturing of several images of a same view albeit using different configurations of the camera. This is sometimes referred to as bracketing wherein images are captured while varying for example the aperture value or the exposure setting of the camera. In view of the ever increasing number of captured images, there is a need for methods enabling efficient management, presentation and manipulation of large quantities of images having a similar image content.

SUMMARY OF THE INVENTIVE CONCEPT

An objective of the present inventive concept is to meet this need. A further object is to provide methods which, in addition to the former object, make use of image data from several images to provide technically improved images or in a user friendly manner. A further object is to enable these objects to be performed efficiently also on devices having limited displays of limited dimension.

According to a first aspect of the inventive concept there is provided a method of providing an adjusted digital image representation of a view, the method comprising:

providing a set of images, wherein the images of said set depict a same view and are captured with a digital camera using different configurations of the digital camera;

determining an initial representation of the view by providing a primary image based on image data of at least a first image of said set;

sending the primary image for presentation of the initial representation on a display;

providing a secondary image based on image data of at least a second image of said set, wherein the first image and the second image are different images captured using different configurations of the digital camera; and sending, in response to receiving a user command, the secondary image for presentation of an adjusted representation of the view on the display.

An advantage of the inventive method is that the representation of the view may be easily adjusted by using data from different images of the image set. The image set may include a plurality of images captured using different camera configurations. Hence, the inventive method enables the user to adjust the representation of the view simply by entering an appropriate user command wherein an adjusted representation of the view may be provided. By using a set of images captured using different settings the extent of the adjustments may be increased. In case a single image had been used the bit depth of the single image could be a limiting factor for making adjustments to a greater extent than in the inventive method.

By first sending the primary image for presentation of the initial representation on the display, handling of the image set is simplified since only a single representation of the view needs to be presented to the user. The inventive method then enables the user to navigate, so to say, within the image set by selecting a desired adjustment. This may be more efficient than the user simultaneously being presented with many images (possibly of reduced scale) and then manually having to scan the images for the desired representation. This may be an especially valuable feature when viewing images on a device having a display of limited size, for example on a portable user device such as a smart phone.

The first image may be a predetermined image of said set for providing the primary image.

The method may further comprise selecting the second image from said set based on a predetermined indication indicating the second image as an image to be used for providing the secondary image.

The method may further comprise determining candidate images for providing the secondary image, the determining being based on a predetermined indication indicating at least two images of the set as candidate images, each of the at least two images being associated with a different user command; providing said different user commands to a user; receiving a user command; and determining the candidate image which is associated with the received user command, wherein the determined image is selected as the second image. This enables the user to apply a desired adjustment to the initial representation of the view simply by entering the appropriate user command.

According to one embodiment the method further comprises determining a first characteristic of the first image; analyzing said set to identify an image of said set presenting a second characteristic, different from said first characteristic; and selecting the identified image as the second image. The method may thus automatically identify an image of the image set which may be used for providing an adjusted representation of the view. The first and the second characteristic may be an exposure- or capture-related characteristic.

According to one embodiment the first and the second characteristic are determined by analyzing a data portion of the first image and a data portion of the second image, respectively. The analyzed data portions may include metadata. Additionally or alternatively the analyzed data portions may include image data.

According to one embodiment determining the first characteristic of the first image includes determining, for the first image, a first setting of a first parameter of the digital camera and a first setting of a second parameter of the digital camera, which second parameter is different from the first parameter, said first settings being used when capturing the first image; and wherein identifying an image of said set presenting a second characteristic includes identifying an image of said set which has been captured using the first setting of the first parameter and a second setting of the second parameter, which second setting is different from said first setting of the second parameter. This enables a well-defined adjustment to be applied to the initial representation since the secondary image depicting the adjusted representation will have a setting of at least one parameter in common with the primary image depicting the initial representation.

According to one embodiment the method further comprises associating the second image with a specific user command. The specific user command may be provided to a user.

The user may thus apply the adjustment represented by the secondary image by supplying the specific user command. The user command may be provided by displaying it as a user selectable option on the display.

According to one embodiment the secondary image is provided in response to receiving the user command. The method may hence await providing or forming the secondary image until it is certain that the user desires the secondary image to be based on the second image. Unnecessary waste of processing power may thus be avoided.

The primary image may include image data of only the first image. Thus the primary image may be the first image. The secondary image may include image data of only the second image. Thus the secondary image may be the second image.

According to one embodiment the primary image is not based on image data of the second image.

According to one embodiment the secondary image is based on image data of the first and the second image. The adjusted representation of the view may thus be based on image data from more than one image wherein an adjusted representation of improved technical quality may be obtained. The embodiment for example enables formation of so-called High Dynamic Range (HDR) images.

According to one embodiment the primary image and the secondary image have the same image dimension.

According to one embodiment the method further comprises determining, for the second image, a first setting of a third parameter of the digital camera being used when capturing the second image, which third parameter is different from the first and second parameter;

identifying a third image of said set which has been captured using the first setting of the first parameter, the second setting of the second parameter and a second setting of the third parameter;

providing a tertiary image based on image data of at least the third image of said set; and sending, in response to receiving a further user command, the tertiary image for presentation of a further adjusted representation of the view on the display.

Once the adjusted representation has been obtained further adjustments may hence be performed. Since the tertiary image depicting the further adjusted representation will have a setting of at least one parameter in common with the secondary image depicting the adjusted representation this embodiment enables a well-defined further adjustment to be applied to the adjusted representation.

According to one embodiment the primary image is sent to a first user interface component presented on the display and the secondary image is sent to a second a second user interface component presented on the display. This enables a side-by-side comparison to of the initial and the adjusted representation to be made by the user.

According to one embodiment the primary image is sent to a first user interface component presented on the display and the secondary image is sent to the first user interface component. The adjusted representation may thus replace the initial representation on the display. This may be advantageous when the method is used on devices having a display of smaller size. The primary image and the secondary image may be displayed one at a time.

According to one embodiment the method further comprises identifying a subset of images of said set, each image of said subset being captured using a same setting as the first image for at least one parameter of a set of parameters of the digital camera and a different setting than the first image for at least one capture-related parameter of said set of parameters;

associating a different user command with each image of said subset;

receiving a user command; and determining the image of said subset which is associated with the received user command, wherein the determined image is selected as the second image.

Thus a plurality of available adjustments may be identified and each be associated with a different user command. The user may thus conveniently and efficiently apply the desired adjustment to the initial representation. More specifically the subset of images may be identified by comparing a setting of said at least one capture-related parameter for the first image to a setting of said at least one capture-related parameter for other images of said set.

According to one embodiment the method further comprises identifying a subset of images of said set, each image of said subset being captured using a same setting as the first image for at least one parameter of a set of parameters of the digital camera and a different setting than the first image for exactly, i.e. no more and no less, one capture-related parameter of said set of parameters;

associating a different user command with each image of said subset;

receiving a user command; and determining the image of said subset which is associated with the received user command, wherein the determined image is selected as the second image.

Thus a plurality of available adjustments may be identified and each be associated with a different user command. The user may thus conveniently and efficiently apply the desired adjustment to the initial representation. More specifically the subset of images may be identified by comparing a setting of said at least one capture-related parameter for the first image to a setting of said at least one capture-related parameter for other images of said set. A further advantage is that the adjustment may be applied in a controlled manner in that the setting of only one parameter may be changed at a time.

According to one embodiment providing the secondary image includes forming the secondary image by combining the first image and the second image based on an alpha value. The first and second image may be blended using the same alpha value for all pixels. The adjusted representation of the view may thus be based on image data from more than one image wherein an adjusted representation of improved technical quality may be obtained. The first image may be an image captured at a lower exposure value setting and the second image may be an image captured at a higher exposure value setting than the first image. The first image may be an image captured using a first focus point position and the second image may be an image captured using a second, different, focus point position.

According to one embodiment the method further comprises receiving a user indication of an image coordinate; and determining said alpha value based on the received image coordinate. The image coordinate may be a coordinate within the primary image. The user may thus vary the alpha value by selecting different points in the primary image. This provides for an intuitive way of controlling the blending of the first and the second image.

The alpha value may be determined in response to receiving the image coordinate by determining a first property value of a pixel of the first image, the pixel having a coordinate corresponding to the received image coordinate, and determining a second property value of a pixel of the second image, the pixel having a coordinate corresponding to the received image coordinate; and determining said alpha value based on the first and second property value. This provides for a computationally efficient blending operation which may be controlled by the user in real time even when used on a device having limited computational resources. The first and the second property values may for example correspond to a luminance value of a pixel of the first image and a luminance value of a pixel of the second image. The blending operation may thus be based on the exposure levels of the first and the second images. According to another example the first and the second property values may correspond to an image sharpness at a pixel of the first image and a pixel of a second image. The blending operation may thus be based on the sharpness levels of the first and the second images.

Alternatively, the alpha value may be determined by, in response to receiving the image coordinate, retrieving an alpha value at a coordinate of an alpha channel, which coordinate corresponds to the received image coordinate. The alpha channel may thus be used as a Look-Up-Table (LUT) for quickly determining the alpha value to be used for the blending operation. This provides for a computationally efficient blending operation which may be controlled by the user in real time even when used on a device having limited computational resources.

The alpha channel may be determined by applying a predetermined function to the first image and the second image. The predetermined function may include for each alpha value of the alpha channel, determining a first property value of a pixel of the first image and a second property value of a pixel of the second image and calculating said alpha value of the alpha channel using the first and second property values. The alpha channel may thus be determined on a pixel-level based on property values for both the first image and the second image. The first and the second property values may for example correspond to a luminance value of a pixel of the first image and a luminance value of a pixel of the second image. The blending operation may thus be based on the exposure levels of the first and the second images. According to another example the first and the second property values may correspond to an image sharpness at a pixel of the first image and a pixel of a second image. The blending operation may thus be based on the sharpness levels of the first and the second images.

According to a second aspect of the present inventive concept there is provided an apparatus for providing an adjusted digital image representation of a view, comprising:

processing means configured to determine an initial representation of the view by providing a primary image based on image data of at least a first image of a set of digital images, and further configured to provide a secondary image based on image data of at least a second image of said set, wherein the first image and the second image are different images. The set of digital images may be captured with a digital camera using different configurations of the digital camera. The apparatus further includes:

input means configured to receive a first user command;

output means configured to send the primary image for viewing of the initial representation on a display, and, in response to the input means receiving the first user command, send the secondary image for viewing of an adjusted representation of the view on the display.

The second aspect may generally present the same or corresponding advantages as the first aspect. Similarly the various method embodiments may be implemented also by the apparatus of the second aspect.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein.

DETAILED DESCRIPTION OF PREFERRED EMBODIMENTS

Figure 1:
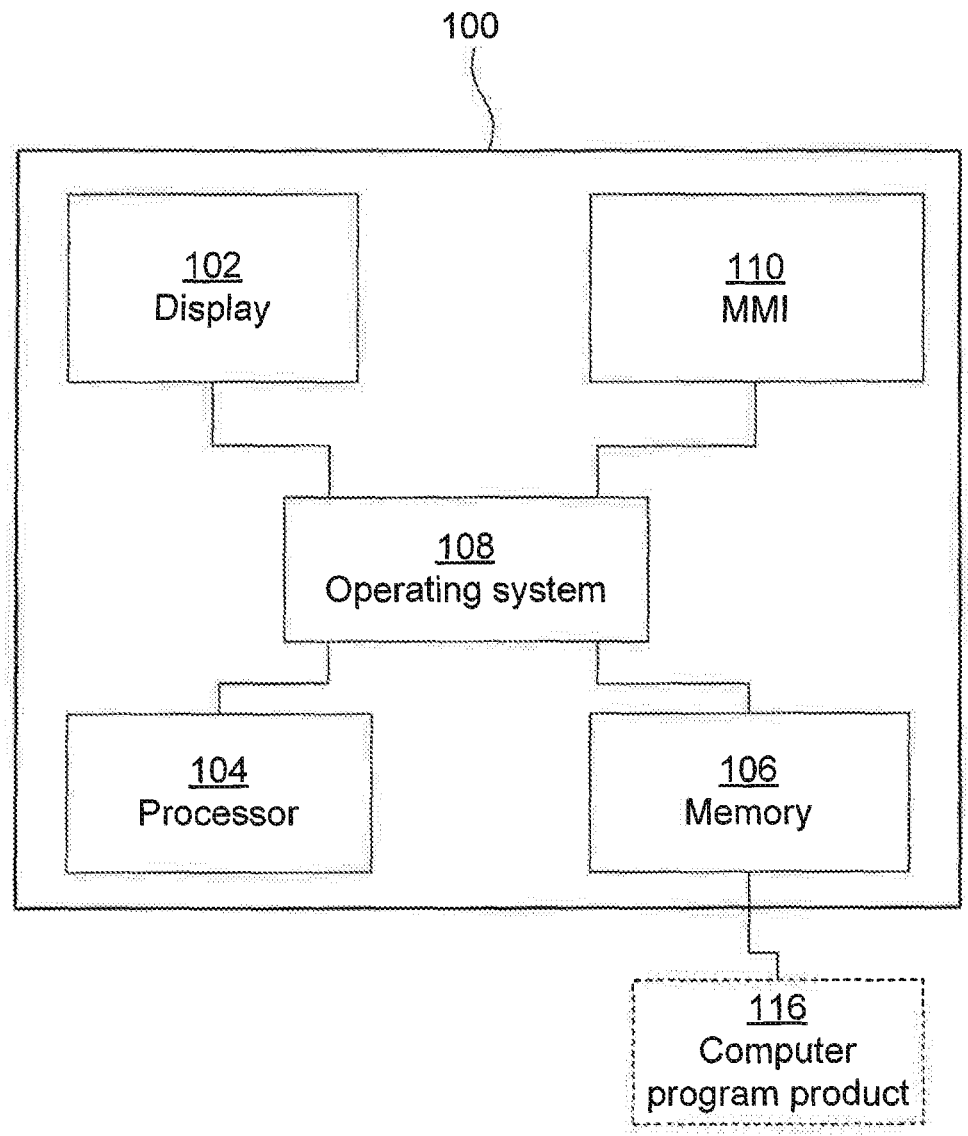
FIG. 1 is a schematic illustration of a user device according to one embodiment.

Detailed embodiments will now be described in connection with a user device 100 schematically illustrated in FIG. 1. The user device 100 may be a digital camera. The user device 100 may also be a personal digital assistant (PDA), a mobile phone, a smart phone or a tablet computer. Although the embodiments will be described in connection with a portable user device, the inventive concept may be implemented also in other types of electronics devices such as in a PC (stationary or laptop), a TV set, a video game console, a digital video recorder etc.

The user device 100 comprises display means. In FIG. 1 the display means is embodied by a display 102. The display 102 may be a Liquid Crystal Display (LCD), a Light Emitting Diode (LED) display. Display technologies per se are well known to the skilled person and will therefore not be elaborated further upon here. As described in more detail below the display 102 may be a touch sensitive display.

The user device 100 comprises processing means. In FIG. 1, the processing means is embodied by a processor 104. The processor 104 may be configured to implement the methods in accordance with the present inventive concept as will be described in detail in the following. The processor 104 may be implemented as one or more field programmable gate arrays (FPGAs), applications specified integrated circuits (ASICs), or the like, wherein the methods of the present inventive concept may be implemented using a hardware description language (HDL). The processor 104 may also be implemented as central processing unit (CPU) of the user device 100, a graphics processing unit (GPU) of the user device 100 or a dedicated image processing unit of the user device 100 configured to implement methods in accordance with the present inventive concept, wherein the methods of the present inventive concept may be implemented using low- or high-level software instructions stored in the user device 100 for execution by the processing unit.

The user device 100 comprises storage means. In FIG. 1 the storage means is embodied by a memory 106. The memory may include a data section for storing digital images. The data memory may be e.g. a random access memory (RAM) integrated in the user device 100 or a flash memory provided on a memory card removably inserted in the user device 100. The memory 106 may further include a program memory for storing software instructions for the processor 104. The program section may e.g. be a RAM or a ROM integrated in the user device 100.

The user device 100 and the components thereof operate under the supervision of an operating system 108. The operating system 108 may be stored in the memory 106 or in another dedicated memory.

The user device 100 comprises input means. In FIG. 1 the input means is embodied by a man-machine interface 110 (MMI). The MMI 110 may include one or more physical buttons, scroll wheels, joysticks, track balls or the like. The MMI 110 may also include peripheral devices, such as a mouse and/or a keyboard. The display 102 of the user device 100 may be a touch sensitive display wherein virtual buttons may be presented on the display 102 and the user may enter commands by touching the display 102. The MMI 110 may also provide gestures wherein the user may interact with the user device 100 for example by making swiping, tapping or pinching gestures on the display 102. The display 102 may be a resistive touch screen, a capacitive touch screen. Touch screen technologies per se are well known to the skilled person and will therefore not be elaborated further upon here.

The methods of the present inventive concept may also be implemented as a computer program product 116 comprising one or more software components. The software components may comprise software instructions that when downloaded to a processor are configured to perform the instructions corresponding to the methods.

Figure 2:
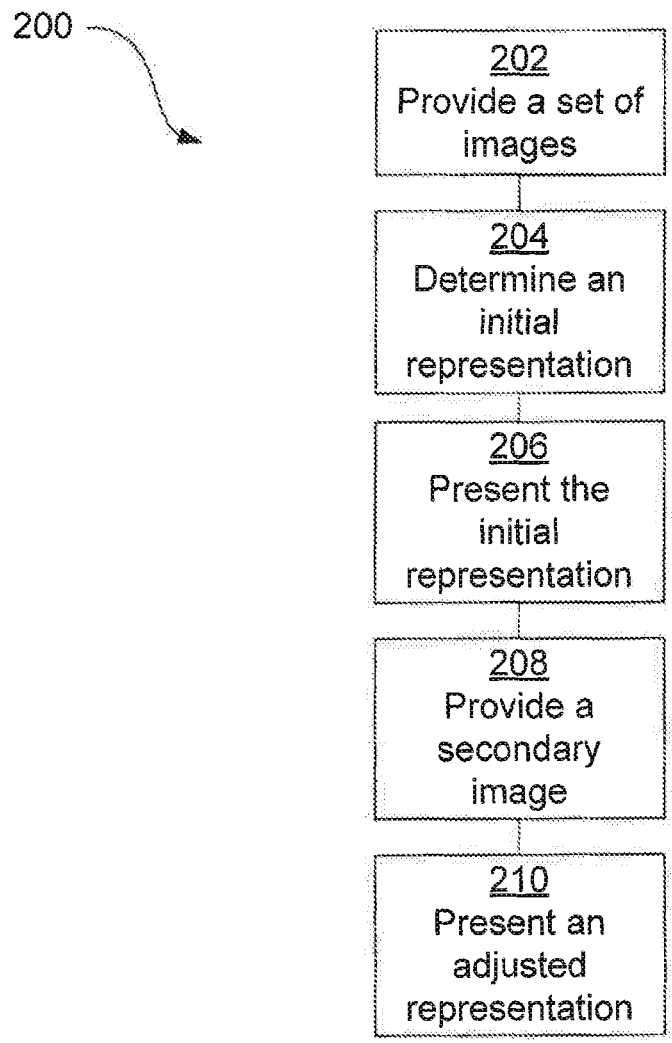
FIG. 2 is a flow chart of a method according to one embodiment.

According to an embodiment which will be described with reference to FIGS. 1-3 a set of digital images (hereinafter referred to as the image set) are provided at the user device 100 (box 202). The image set may be stored in the memory 106. The images of the set may be stored as separate image files (e.g. in JPEG, TIFF or DNG format etc.). The set may be formed for example by storing the separate image files in a common subdirectory of the memory 106. The set may also be formed by storing references to the image files in a set file which may be read and interpreted by the processor 104. The images of the image set may be captured at the same resolution, i.e. the images may have an identical image dimension.

The images of the image set may depict a same view. "A same view" is intended to be construed broadly in the sense that the images need not depict exactly the same view but may have been captured from slightly different viewpoints. This may be the result of comparably minor movements (possibly unconscious) of the camera between the captures. There may also be slight variations between the various view representations of the images due to changes within the view between the captures. For example an object within the view may change its position or a person may change expression or posture. Preferably the images are similar in such a way that they depict the same view (comprising the same photographic elements) and are taken in succession with a fairly small temporal distance in between the captures. Commonly the images have been captured using the same digital camera. However, it is contemplated that the images also may have been captured by different digital cameras. The images of the image set may be captured using different camera configurations. The digital camera may be setup according to a plurality of configurations. Each configuration may include a specific setting of one or more adjustable parameter of the digital camera.

The processor 104 determines an initial representation of the view by providing an image (box 204), said image forming the initial representation of the view. This image will in the following be referred to as the primary image.

The processor 104 may select one image of the image set as the primary image. The primary image may thus include image data from only one image of the image set. In other words the selected image is the primary image. Alternatively, the processor 104 may retrieve image data from two or more images of the image set and provide the primary image by combining the retrieved image data. The primary image may thus include image data from more than one image of the image set. Such a scenario will be described in more detail below.

The memory 106 may store an indication of which image(s) of the image set form(s) the primary image. The indication may for example be stored in the above-mentioned set file. In the case of combined images the memory 106 may further include an indication of how the images should be combined into the primary image (see below). The processor 104 may read the indication and access the image(s) from the memory 106. The indication may simply be a default value. The indication may alternatively have been provided by the user previously indicating the file name of the image constituting the primary image. The processor 104 may alternatively select the primary image automatically. The processor 104 may for example select the image of the image set having the earliest time stamp as the primary image. The processor 104 may for example select the first image of the image set when ordered in an alphabetical fashion by their file names.

Figure 3A:
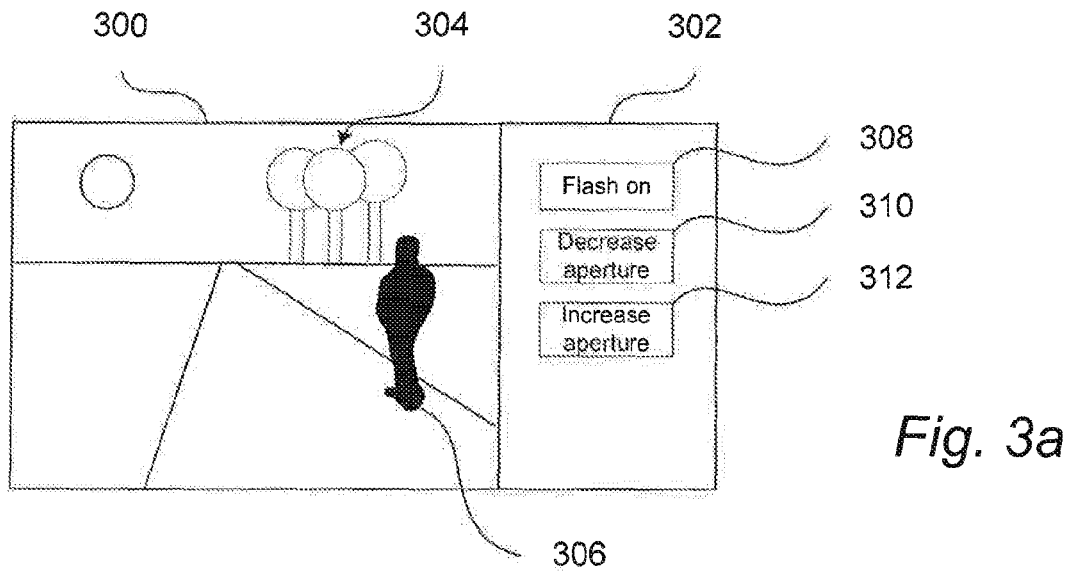
FIGS. 3a-c illustrate a user interface according to one embodiment.

As the primary image has been provided by the processor 104 the initial representation of the view may be presented to the user by displaying the primary image on the display 102 (box 206). This is illustrated in FIG. 3a wherein a schematic primary image depicting inter alia a group of trees 304 and a person 306 is displayed in a user interface (UI) component 300 on the display of the user device 100.

The processor 104 may then identify the available adjustments of the initial representation by analyzing the image set as follows: The processor 104 may analyze the images of the image set to determine characteristics of each image. The characteristics may be capture- or exposure-related characteristics. For example the processor 104 may determine a brightness value and/or a contrast value for each image of the image set. The value may be determined by analyzing image data of each image. The value may be a mean value calculated for at least a portion of each image of the image set. Assuming by way of example that the determined (brightness or contrast) values for some of the images are higher, and for some of the images are lower than the (brightness or contrast) value of the primary image, an available adjustment may be to increase or decrease the (brightness or contrast) value of the initial representation of the view.

A characteristic may also include a setting of one or more parameters of the camera used when capturing the images. The characteristic may thus pertain to a camera configuration. The processor 104 may analyze characteristics pertaining to one or more of the camera parameters aperture, exposure time, exposure value, flash usage, flash strength, flash synchronization speed, color settings, white balance, focus point and exposure index rating (EI or ISO). The characteristics may be determined by the processor 104 analyzing capture information associated with each image of the image set. The capture information may be stored in the memory 106. The capture information may be stored in a metadata portion for each image. The capture information may be stored in accordance with the Exchangeable image file format (EXIF). The capture information may be stored in accordance with the Extensible Metadata Platform (XMP). The metadata may be stored in each image file or in so-called sidecar files.

The processor 104 may determine each different configuration used when capturing the image set as an available adjustment. In other words the processor 104 may determine a first characteristic of the primary image and then identify images of the image set presenting a characteristic, different from the first characteristic. The characteristic of each identified image may then be considered to represent an available adjustment of the initial representation of the view. In other words, the initial representation may be adjusted in accordance with any one of the characteristics of the identified images.

According to the illustrated example the image set may include:

a first image captured using a first aperture value and without flash;

a second image captured using a second aperture value, smaller than the first aperture value, and without flash;

a third image captured using a third aperture value, larger than the first aperture value, and without flash;

a fourth image captured with standard flash strength and using the first aperture value;

a fifth image captured with standard flash strength and using the second aperture value;

a sixth image captured with standard flash strength and using the third aperture value;

a seventh image captured with reduced flash strength using the first aperture value; and an eighth image captured with increased flash strength using the first aperture value.

Assuming that the first image is selected as the primary image, the following options may be presented to the user:

1. Set the aperture value to the second aperture value and do not turn on the flash.

2. Set the aperture value to the third aperture value and do not turn on the flash.

3. Set the aperture value to the first aperture value and turn on the flash at standard strength.

4. Set the aperture value to the second aperture value and turn on the flash at standard strength.

5. Set the aperture value to the third aperture value and turn on the flash at standard strength.

6. Set the aperture value to the first aperture value and turn on the flash at reduced strength.

7. Set the aperture value to the first aperture value and turn on the flash at increased strength.

The method hence enables an emulation of the capturing conditions prevailing during the actual image capture.

Alternatively, the available adjustments may be presented such that one setting may be varied at a time. Returning to the illustrated embodiment in FIG. 3a the above-mentioned first image of the image set has been selected as the primary image. The processor 104 analyzes the first image and determines that it has been captured using a first setting of a first parameter (i.e. no flash) and a first setting of a second parameter (i.e. the first aperture value). The processor 104 then analyzes the remaining images of the image set. The processor 104 determines that the second image has been captured with the same setting of the first parameter as the first image (i.e. no flash) and a different setting of the second parameter than the first image (i.e. the second aperture value). Analogously, the processor 104 determines that the third image has been captured with the same setting of the first parameter as the first image and a different setting of the third parameter than the first image (i.e. the third aperture value). Additionally the processor 104 determines that the fourth image has been captured with a different setting of the first parameter than the first image (i.e. standard flash) and the same setting of the second parameter as the first image (i.e. the first aperture value). Accordingly, the adjustments 308, 310, 312 are presented on the display 102 in the user interface component 302. It should be noted that the illustrated arrangement and the relative dimensions of the user interface components 300 and 302 in FIG. 3a only constitute one possible example.

The processor 104 determines that the remaining images of the image set have been captured with different settings of both the first and second parameter compared to the first image. The remaining images are therefore determined to not represent available adjustments of the initial representation of the view. In other words, only images of the image set having a setting of at least one parameter in common with the first image and a different setting of only one capture-related parameter than the first image may be determined to represent available adjustments of the initial representation.

It should be noted that each image of the image set may present settings of more parameters than aperture and flash, for example any of parameters discussed above in connection with the camera may be used. The processor 104 may be configured to consider the settings of only a subset of the available parameters of the images. The subset of parameters to be considered may for example be indicated in the above-mentioned set file. Alternatively, it may be a user configurable option wherein the user may indicate the parameter subset by ticking appropriate boxes in a dialog or a configuration form accessible on the user device 100.

The available adjustments may also be determined in alternative manner. The memory 106 may include a set of indications indicating a number of images of the set as candidate images for providing an adjusted representation of the view. The indications may be stored in the above-mentioned set file. The indications may be stored in the candidate images. The set of indications may for example have been provided by the user previously indicating the file names of the images constituting candidate images. The capturing process during which the image set has been captured may also be fixed in the sense that images are captured with a number of predetermined different camera settings which are known to the processor 104. The set of indications may be provided as software instructions instructing the processor 104 which images of the image set are candidate images (e.g. by referring to their number in the sequence or using a standardized naming of the image files). The processor 104 may thus determine what adjustments of the initial representation are available, i.e. what candidate images are available. The indication may indicate what type of adjustment the candidate image pertains to. Each available adjustment may be presented as a selectable option on the display 102, wherein the user may select one of the options to effect the desired adjustment of the initial representation of the view. Hence, each candidate image may be associated with a different user command. It is contemplated that the available adjustments need not be presented on the display 102. Instead each of the available adjustments may be associated with a specific command which may be entered using the MMI 110. In case the display 102 is a touch sensitive display the available adjustments may be effected by using the appropriate touch command, e.g. a double tap to adjust the initial representation in accordance with a first candidate image, a left swipe and a right swipe to adjust the initial representation in accordance with a second and third candidate image, respectively. The specific command to be associated with each candidate image may be included in the set of indications. Alternatively the commands may be assigned in accordance with a default configuration.

Different sets of candidate images may be provided for each image of the set. In analogy with the above-described embodiment, a set of candidate images for the first image may include only images of the image set having a setting of at least one parameter in common with the first image and a different setting of only one capture-related parameter than the first image.

Returning to the illustrated embodiment of FIG. 3a the user may select one of the adjustments 308, 310, 312 by entering the appropriate command using the MMI 110. It is contemplated that the available adjustments need not be presented on the display 102. Instead each of the available adjustments may be associated with a specific command which may be entered using the MMI 110. In case the display 102 is a touch sensitive display the available adjustments may be effected by using the appropriate touch command, e.g. a double tap to turn on the flash, a left swipe to decrease the aperture value and a right swipe to increase the aperture value.

The MMI 110 receives the user command associated with one of the available adjustments. In response thereto, the processor 104 provides an image representing the view in accordance with the selected adjustment (box 208). If the user selects adjustment 308 the processor 104 selects the fourth image for the adjusted representation. If the user selects the adjustment 310 the processor 104 selects the second image for the adjusted representation. If the user selects the adjustment 312 the processor 104 selects the third image for the adjusted representation. In either case the provided image thus includes image data from only one image of the image set.

Figure 3B:
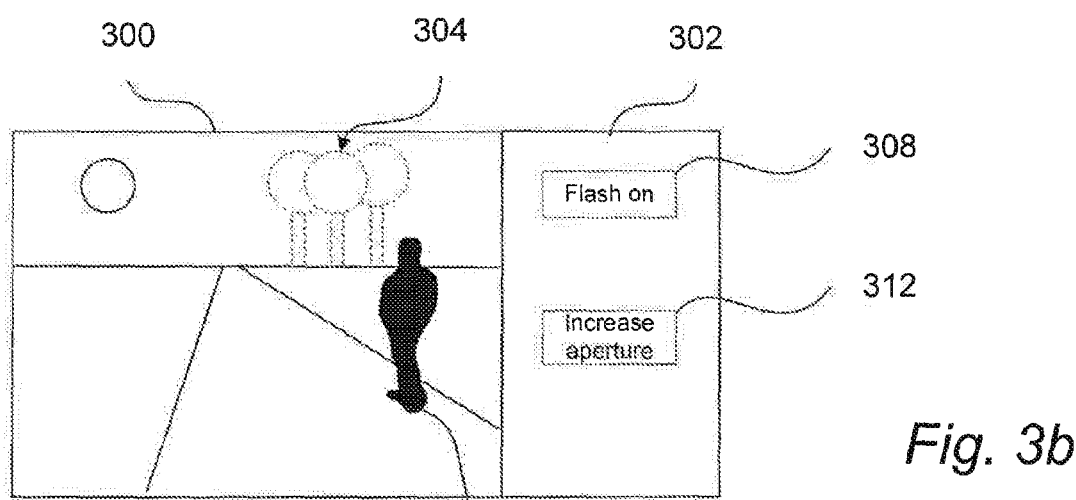

In the case illustrated in FIG. 3b, the user has selected adjustment 310 wherein the second image is presented in the user interface component 300 (box 210). As schematically indicated the sharpness of the trees 304 as a result has decreased.

Figure 3C:
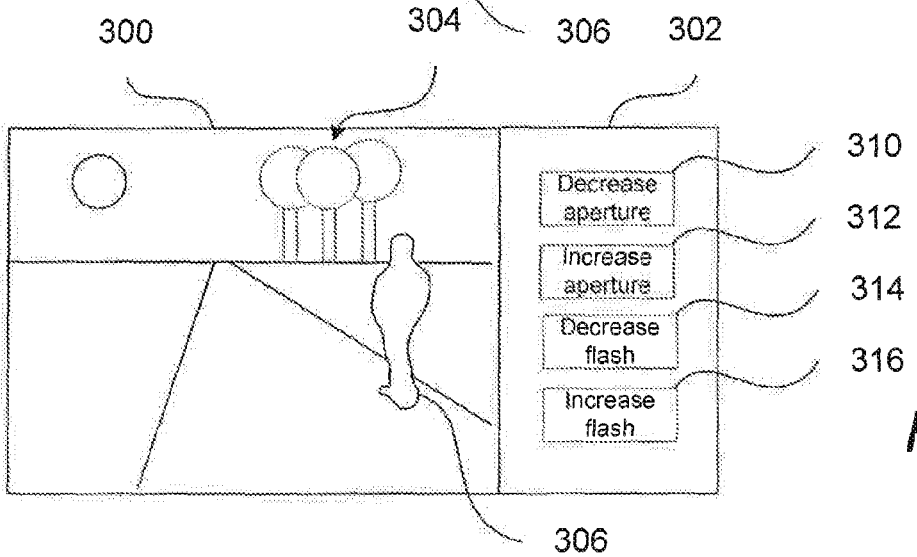

FIG. 3c illustrates an alternative scenario wherein the user instead has selected adjustment 308 in FIG. 3a. In response thereto the fourth image is presented in the user interface component 300. As schematically indicated the person 306 is illuminated.

After presenting the appropriate image, the process may proceed in analogy with the above. The processor 104 may identify the images of the image set having a setting of at least one parameter in common with the image illustrating the adjusted representation of the view. In the situation illustrated in FIG. 3b the processor 104 may determine that the aperture value may be increased (adjustment 312) using the first image and that the flash may be turned on using the fifth image (adjustment 308).

In the situation illustrated in FIG. 3c the processor 104 may determine that the aperture value may be decreased (adjustment 310) using the fifth image, that the aperture value may be increased (adjustment 312) using the sixth image, that the flash strength may be reduced (adjustment 314) using the seventh image and that the flash strength may be increased (adjustment 316) using the eighth image. Although left-out for clarity from FIG. 3c the flash may also be turned off using the first image.

Figure 4A:
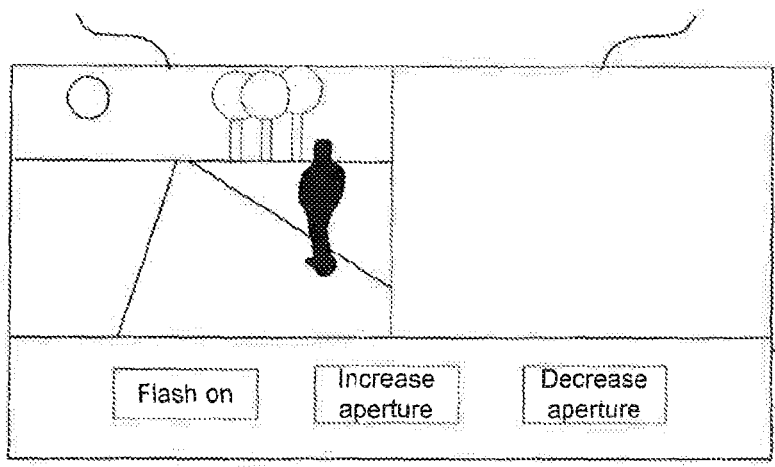
FIGS. 4a-b illustrate a user interface according to one embodiment.
Figure 4B:
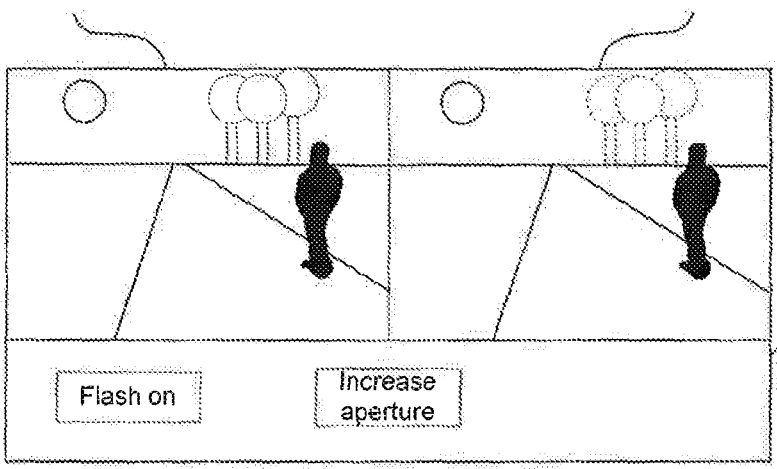

FIG. 4a illustrates a user interface according to an alternative embodiment. The alternative embodiment is in most parts identical to the embodiment illustrated in FIGS. 3a-c but differs in that the user interface includes a first UI component 400a and a second UI component 400b. The primary image (i.e. the initial representation of the view) is displayed in the UI component 400a. The UI component 400b is provided adjacent to the UI component 400a. Initially the UI component 400b is empty, i.e. does not display any digital image. The available adjustments which are the same as in FIG. 3a are displayed in the UI component 402. In FIG. 4b the user has selected the adjustment 402 wherein the adjusted representation of the initial view is presented to the user by displaying the second image in the user interface component 400b. The first image and the second image are thus presented in a side-by-side manner enabling easy evaluation of the adjustment for the user.

Figure 5A:
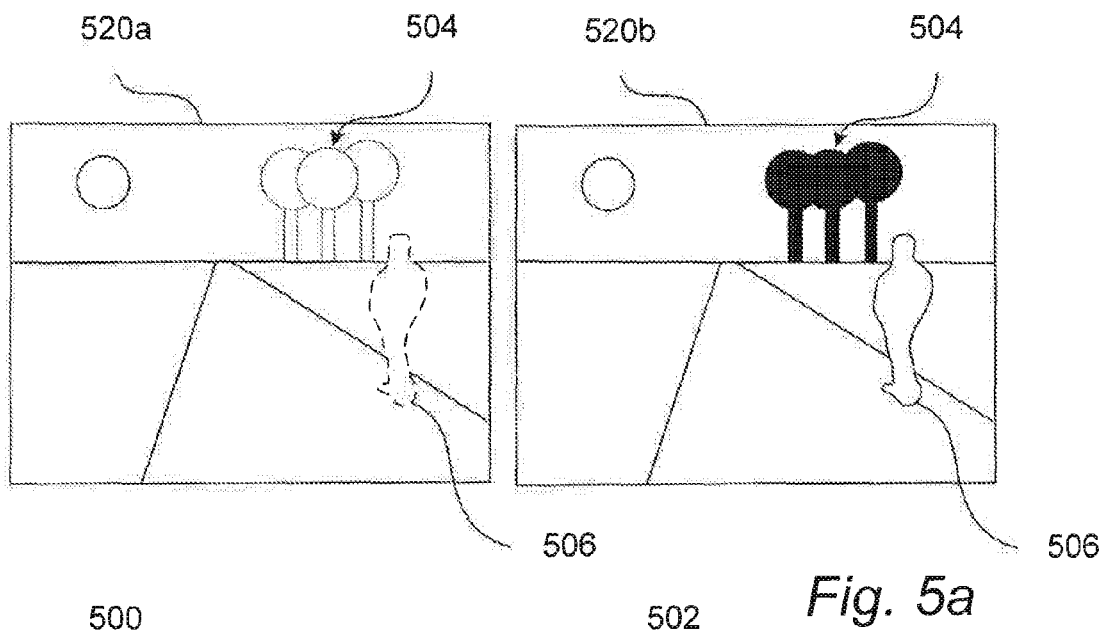
FIGS. 5a-c illustrate a user interface according to one embodiment.
Figure 5B:
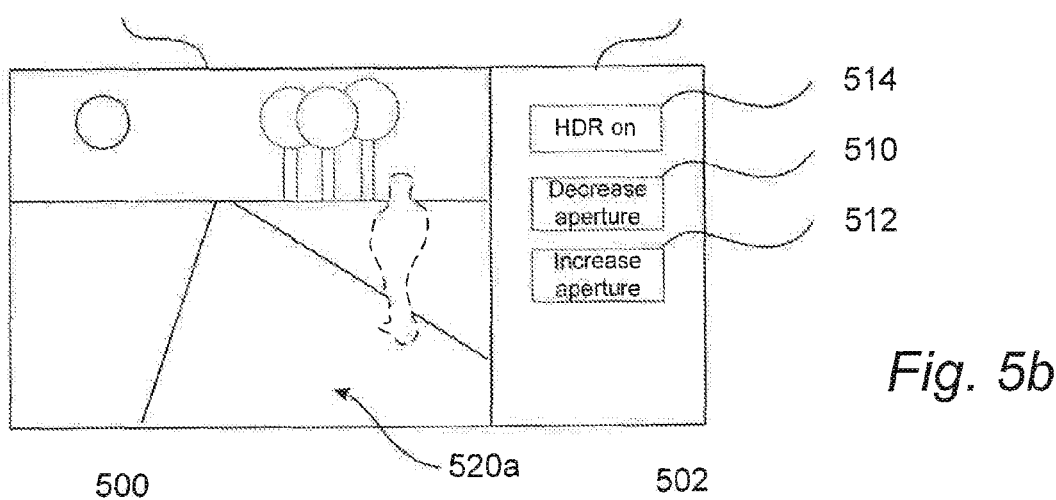

As mentioned above the primary image may include image data from more than one image of the image set. Also the adjusted representation of the initial view may be provided by combining image data from more than one image of the image set. These aspects may be better understood from the embodiment illustrated in FIGS. 5a-c.

An image set is provided. The image set includes inter alia images 520a and 520b. The image 520a and the image 520b present different characteristics. In the image 520a the exposure level is acceptable in the part depicting the trees 504 but too high in the part depicting the person 506, thus resulting in the person 506 being overexposed. In the image 520b the exposure level is acceptable in the part depicting the person 506 but too low in the part depicting the trees 504, thus resulting in the trees 504 being underexposed. In other, more general terms, the image 520a image has been captured using a higher exposure value setting and the image 520 has been captured using a lower exposure value setting of the camera.

According to the illustrated example the image 520a is selected as the primary image, i.e. as the initial representation of the view. The processor 104 may in analogy to the previously described embodiments analyze the set of images and determine that the image set includes an image 520b captured at a lower exposure value than the image 520a. The processor 104 may make this determination by analyzing metadata of the images. Alternatively or additionally the processor 104 may make this determination by analyzing image data of the images. The processor 104 may for example determine that the image 520b presents a lower overall brightness level than the image 520a. The processor 104 may thus determine that a so-called High Dynamic Range (HDR) image may be formed by combining image data from the image 520a with image data from the image 520b. In response HDR adjustment 514 is presented in the user interface component 502 (see FIG. 5b). Completely analogously to the previous embodiments, further adjustments 510, 512 may depending on the image set be available and presented to the user.

Figure 5C:
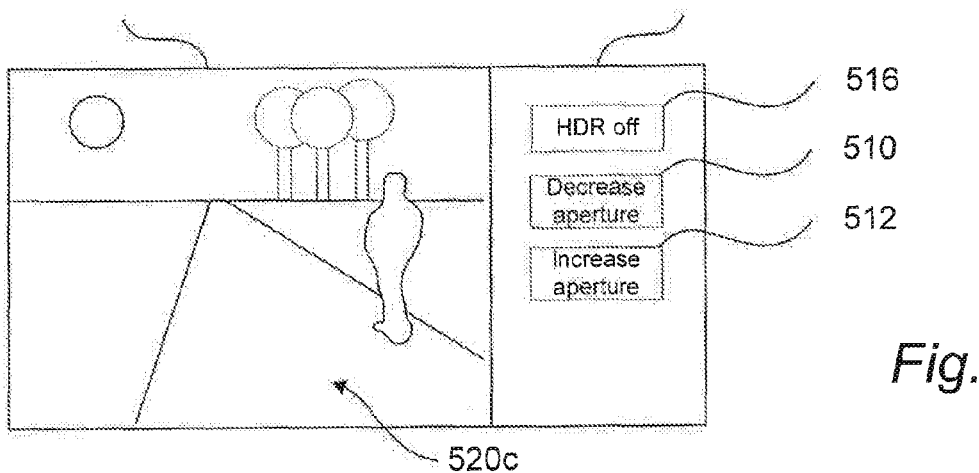

FIG. 5c illustrates the scenario where the user has chosen the HDR adjustment 514. The processor 104 then determines the adjusted representation of the view by forming an image 520c including image data from the image 520a and image data from the image 520b. The image 520c is presented in the user interface component 500. The image 520c may be formed by blending image data from the images 520a, 520b together. The blending operation may include alpha blending the images 520a, and 520b.

It should be noted that the process may flow in the reverse direction as well. The image 520c may hence be selected as the primary image wherein the processor 104 may determine that one of the available adjustments is to turn HDR off, corresponding to adjustment 516 in FIG. 5c.

According to one embodiment there is provided a method for adjusting the image 520c. According to this embodiment the user may input an image coordinate to the user device 100 via the MMI 110. In case the user device 100 includes a touch screen the user may e.g. tap at a point within the image 520c. In case the MMI 110 includes a pointer device (such as a mouse, a joystick, a track ball) the user may steer a pointer shown on the display 102 to a desired location in the image wherein the image coordinate of the indicated location may be determined.

In response to receiving the image coordinate the processor 104 may determine a first property value of a pixel of the image 520a, the pixel having a coordinate corresponding to the received image coordinate. Analogously, the processor 104 may determine a second property value of a pixel of the image 520b, the pixel having a coordinate corresponding to the received image coordinate. Denoting the received image coordinate $(x_i, y_i)$, the property value of the pixel of the image 520a having the coordinate $(x_i, y_i)$ and the property value of the pixel of the image 520b having the coordinate $(x_i, y_i)$ may be determined. Based on the first and second property value an alpha value $\alpha$ for forming an updated version of the image 520c may be determined.

More specifically, the first property value may be the luminance value $L_1$ of the pixel of the first image. The second property value may be the luminance value $L_2$ of the pixel of the second image. Using the first property value, a first relative property value $R_1$ may be calculated. The first relative property value $R_1$ may indicate the deviation of the first property value from a predetermined threshold value $L_T$. Analogously, using the second property value, a second relative property $R_2$ value may be calculated. The second relative property value $R_2$ may indicate the deviation of the second property value from the predetermined threshold value $L_T$. The predetermined threshold value may be determined to be close to a half of the maximum value of the first and second property value. In the context of the luminance values $L_1 = [0, 255]$ and $L_2 = [0, 255]$ (assuming an 8-bit representation) a relative property value $R_j$ (for j=1, 2) may be determined using the following formula:

$$R_j = 129 - |L_j - L_T|,$$

where $L_T$ may be set to 128. The image 520a may be selected as the foreground image and the image 520b may be selected as the background image. The alpha value $\alpha$ may then be calculated as a ratio between the first relative property value and the sum of the first and the second relative property value, i.e. $\alpha = R_1/(R_1+R_2)$. From this formula it may be understood that the value 129 when calculating $R_j$ has been chosen to avoid division by zero in case both $L_1$ and $L_2$ are equal to 255 or 0. Other choices are possible for example any value in the range 130-140 may be used purely by way of example. Alternatively, the image 520b may be selected as the foreground image and the image 520a may be selected as the background image. The alpha value $\alpha$ may then be calculated as a ratio between the second relative property value and the sum of the first and the second relative property value, i.e. $\alpha = R_2/(R_1+R_2)$.

As will be appreciated by the skilled person these formulas only constitute one possible example within the scope of the invention and that other choices also are possible. For example other functions for calculating the deviation of the luminance value from the threshold value $L_T$ may be chosen which exhibit a smaller change in a region of luminance values close to $L_T$. Moreover, the method may rely on a look-up-table (LUT) mapping the full range of luminance values to a respective relative property value. The calculation of $R_j$ may thus be replaced with retrieving a correct value from the LUT.

Once the alpha value has been determined, the images 520a and 520b may be blended together. Assuming 520a image is selected as the foreground image and the image 520b is selected as the background image, any pixel i at the coordinate $(x_i, y_i)$ in the combined image may be calculated by blending the pixel at coordinate $(x_i, y_i)$ of the image 520a and the pixel at coordinate $(x_i, y_i)$ of the image 520b using the following formula:

$$V_{520c, (xi, yi)} = (1-\alpha)*V_{520b, (xi, yi)} + \alpha*V_{520a, (xi, yi)}$$

Alternatively, the alpha value $\alpha$ may be retrieved from an alpha channel. In response to receiving the image coordinate $(x_i, y_i)$ the alpha value at the position in the alpha channel corresponding to the coordinate $(x_i, y_i)$ may be retrieved. The alpha channel may include a two-dimensional matrix having the same dimensions as the first and the second image wherein each element of the matrix includes the alpha value for a pixel at a corresponding position in the first or the second image. In this sense the alpha channel may be represented by an image including pixels, wherein a pixel at coordinate $(x_i, y_i)$ may indicate an alpha value for a pixel at coordinate $(x_i, y_i)$ in the image 520a and the image 520b.

The alpha channel may be a predetermined alpha channel. Alternatively, the alpha channel may be determined based on the first and the second image. The alpha channel may for example be determined in response to the processor 104 selecting the image 520b from the image set. The alpha channel may be calculated in respect of either one of the images 520a or 520b. In the following it will be assumed that the image 520a is selected as the foreground image and that the image 520b is selected as the background image. The alpha channel may be determined by applying a predetermined function to the image 520a and the image 520b. More specifically each pixel $(x_i, y_i)$ of the alpha channel may be determined as follows: A first property value (e.g. luminance value $L_1$) of a pixel at coordinate $(x_i, y_i)$ of the image 520a and a second property value (e.g. luminance value $L_2$) of a pixel at coordinate $(x_i, y_i)$ of the image 520b may be determined. The alpha value of the alpha channel for coordinate $(x_i, y_i)$ may then be calculated using the formula: $\alpha = R_1/(R_1+R_2)$, wherein R1 and R2 are the relative property values as defined above.

In a preferred usage scenario, the user may repeatedly provide new image coordinates (e.g. by tapping at or by moving a pointer to different locations in the combined image 520c) wherein an updated image 520c may be formed using any one of the above-mentioned methods and then presented on the display 102. The user may thus interactively control the blending operation. Due to the efficiency of the method this functionality may be provided also on hardware having limited processing capacity.

The above-described method has a more general applicability in that it may be used in combination with other types of pixel properties than luminance. For example the first property value may be a saturation value and the second property value may be a saturation value, wherein corresponding relative saturation property values may be calculated in the same manner as described above. The relative saturation property values may then be used calculate a single alpha value or an alpha channel image, in a manner completely analogous to the above.

According to another example, the method may be applied to a scenario wherein images 520a and 520b have been captured with different settings of the focus point.

Different parts of the depicted view may thus be sharp in the images 520a and 520b. The first property value may be determined for the image 520a by high pass filtering the image 520a. The high pass filtering may be implemented by applying a discrete Laplace transform to the image 520a. The transform may be determined by convolving the image with the kernel:

$$L = \begin{pmatrix} 0 & 1 & 0 \\ 1 & -4 & 1 \\ 0 & 1 & 0 \end{pmatrix}$$

Each pixel $(x_i, y_i)$ of the transformed image includes a property value (i.e. the first property value) for the pixel $(x_i, y_i)$ of the image 520a. The second property value of the image 520b may be determined in a completely analogous manner wherein each pixel $(x_i, y_i)$ of the transformed image includes a property value (i.e. the second property value) for the pixel $(x_i, y_i)$ of the image 520b.

Denoting the first property value as $D_1$ for a pixel $(x_i, y_i)$ of the image 520a and the second property value as $D_2$ for a pixel $(x_i, y_i)$ of the image 520b a respective alpha value may be determined as $\alpha = D_1/(D_1+D_2)$ (assuming that the image 520a is selected as the foreground image and that the image 520b is selected as the background image). Analogously to the above methods the alpha value may be calculated in response to the user inputting the image coordinates using the MMI 110 or by retrieving an alpha value from an alpha channel.

Using the method, the user may provide image coordinates in a region of an image wherein, assuming that one of the images 520a, 520b are sharp in said region, a combined image which is sharp in the desired region may be obtained. The user may thus interactively adjust the focus point in the image.

The above-described methods of combining images based on an alpha value may be regarded as an inventive aspect quite independent from the inventive aspects embodied in FIGS. 1-4. Thus, there is provided a method for combining images comprising: forming a combined image from a first image and a second image. The first image and the second image may depict a same view. The first and the second image may thus be similar in that they include the same photographic elements. The first image may be captured using a first camera setting and the second image may be captured using a second camera setting, different from the first setting. The first image may present a higher exposure level than the second image. The first image may be captured with a different focus point position than the second image. The first and second image may be combined based on an alpha value. The first and second image may be blended using the same alpha value for all pixels of the combined image.

The method may further comprise receiving a user indication of an image coordinate. The image coordinate may be an image coordinate of the first image or the second image. The image coordinate may be a pixel coordinate. The alpha value may be determined based on the received image coordinate. In response to receiving the image coordinate a first property value of a pixel of the first image may be determined, the pixel having a coordinate corresponding to the received image coordinate. Furthermore, a second property value of a pixel of the second image may be determined, the pixel having a coordinate corresponding to the received image coordinate. The alpha value may then be determined based on the first and second property value.

Alternatively, the alpha value may be determined by, in response to receiving the image coordinate, retrieving an alpha value at a coordinate of an alpha channel, which coordinate corresponds to the received image coordinate. The alpha channel may be a predetermined alpha channel. The alpha channel may be determined by applying a predetermined function to the first image and the second image. The predetermined function may include: for each alpha value of the alpha channel, determining a first property value of a pixel of the first image and a second property value of a pixel of the second image and calculating said alpha value of the alpha channel using the first and second property values. The pixel of the first image may have a coordinate corresponding to the received image coordinate. Similarly the pixel of the second image may have a coordinate corresponding to the received image coordinate. Hence by the user providing different image coordinates a different combined image may be formed. The method may be implemented in a device as discussed in connection with FIGS. 5a-c above.

In the above, methods have been described in connection with a user device 100. However it is contemplated that the methods may be used in other scenarios as well. The image set may be stored at a server connected to a network, such as the Internet. A user device may connect to the server via the network. The server may include input and output means for sending and receiving data to/from the user device via the network. The input and output means may be e.g. be realized by a Network Interface Card (NIC). The server may provide the image set to the user device wherein the user device may download the image set from the server. The user device may further download software instructions (e.g. in the form of Java, HTML, JavaScript or a combination thereof) implementing any one of the above-described methods. The user interface may hence be provided in the form of a web page. The web page may be displayed in a web browser running on the user device. A processor of the user device may then perform the respective method accordingly. Alternatively, processing means of the server may determine the initial representation of the view in any one of the above-described manners and send the primary image depicting the initial representation the user device using the output means. Upon receiving the primary image, the user device may present the image on a display thereof. The server may further, in a manner analogous to the above described methods, determine the available adjustments and provide user commands to the client device for effecting each adjustment. Similar to the above scenario, the user interface may be provided in the form of a web page. The web page may be displayed in a web browser running on the user device. The provided user commands may be presented on the web page. The user may apply one of the available adjustments by selecting one of the provided user commands, e.g. by selecting the appropriate option on the web page. The server may receive the user command via the input means (e.g. via the NIC). In response thereto an image depicting the adjusted representation may be sent to the client device for presentation. The image may e.g. be presented on the web page.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method comprising:
providing a set of images, wherein the images of said set depict a same view and are captured with a digital camera using different configurations of the digital camera, wherein each configuration comprises specific settings for a set of parameters of the digital camera;
determining an initial representation of the view by providing a primary image based on image data of at least a first image of said set;
sending the primary image for presentation of the initial representation on a display;
identifying a first subset of images of said set, each image of said first subset being captured using a same setting as the first image for at least one parameter of said set of parameters of the digital camera and a different setting than the first image for at least one capture-related parameter of said set of parameters, and the remaining images of said set, not being images of the first subset, are images of a second subset;
associating each image of said first subset and no images of said second subset with a different user command;
determining the image of said first subset which is associated with a received user command, wherein the determined image is selected as a second image;
providing a secondary image based on image data of at least the selected second image, wherein the first image and the second image are different images; and
sending the secondary image for presentation of an adjusted representation of the view on the display.

2. A method according to claim 1, further comprising determining the first subset of images for providing the secondary image, the determining being based on a predetermined indication indicating at least two images of the set as candidate images for the first subset.

3. A method according to claim 1, further comprising:
determining a first characteristic of the first image;
analyzing said set to identify an image of said set presenting a second characteristic, different from said first characteristic; and
selecting the identified image as the second image.

4. A method according to claim 3, wherein the first and second characteristic are determined by analyzing a data portion of the first image and a data portion of the second image, respectively.

5. A method according to claim 4, wherein said data portions include metadata.

6. A method according to claim 3, wherein said data portions include image data.

7. A method according to claim 3, wherein determining the first characteristic includes:
determining, for the first image, a first setting of a first parameter of the digital camera and a first setting of a second parameter of the digital camera, said first settings being used when capturing the first image;
and wherein identifying an image of said set presenting a second characteristic includes:
identifying an image of said set which has been captured using the first setting of the first parameter and a second setting of the second parameter.

8. A method according to claim 7, further comprising:
determining, for the second image, a first setting of a third parameter of the digital camera being used when capturing the second image;
identifying a third image of said set which has been captured using the first setting of the first parameter, the second setting of the second parameter and a second setting of the third parameter;
providing a tertiary image based on image data of at least the third image of said set; and
sending, in response to receiving a further user command, the tertiary image for presentation of a further adjusted representation of the view on the display.

9. A method according to claim 1, further comprising providing said specific user command to a user.

10. A method according to claim 1, wherein the primary image includes image data of only the first image.

11. A method according to claim 1, wherein the secondary image includes image data of only the second image.

12. A method according to claim 1, wherein the secondary image is based on image data of the first and the second image.

13. A method according to claim 1,
wherein each image of said first subset is captured using a different setting than the first image for exactly one capture-related parameter of said set of parameters.

14. A method according to claim 1, wherein providing the secondary image includes forming the secondary image by combining the first image and the second image based on an alpha value.

15. An apparatus comprising:
processor circuitry configured to enable:
determining an initial representation of a view by providing a primary image based on image data of at least a first image of a set of digital images, wherein the images of said set depict a same view and are captured with a digital camera using different configurations of a digital camera, wherein each configuration comprises specific settings for a set of parameters of the digital camera;
identifying a first subset of images of said set, each image of said first subset being captured using a same setting as the first image for at least one parameter of said set of parameters of the digital camera and a different setting than the first image for at least one capture-related parameter of said set of parameters, and the remaining images of said set, not being images of the first subset, are images of a second subset;
associating each image of said first subset and no images of said second subset with a different user command;
determining the image of said subset which is associated with a received first user command, wherein the determined image is selected as a second image; and
providing a secondary image based on image data of at least the selected second image, wherein the first image and the second image are different images.

16. An apparatus comprising:
at least one processor; and
at least one memory including computer program instructions,
the at least one memory and the computer program instructions configured to, with the at least one processor, cause the apparatus at least to perform:
determining an initial representation of a view by providing a primary image based on image data of at least a first image of a set of images, wherein the images of said set depict a same view and are captured with a digital camera using different configurations of the digital camera, wherein each configuration comprises specific settings for a set of parameters of the digital camera;

sending the primary image for presentation of the initial representation on a display;

identifying a first subset of images of said set, each image of said first subset being captured using a same setting as the first image for at least one parameter of said set of parameters of the digital camera and a different setting than the first image for at least one capture-related parameter of said set of parameters, and the remaining images of said set, not being images of the first subset, are images of a second subset;

associating each image of said first subset and no images of said second subset with a different user command;

determining the image of said first subset which is associated with a received user command, wherein the determined image is selected as a second image;

providing a secondary image based on image data of at least the selected second image, wherein the first image and the second image are different images; and sending the secondary image for presentation of an adjusted representation of the view on the display.

17. An apparatus as claimed in claim 16, configured as a portable user camera device comprising a man machine interface configured to detect user gestures or a touch sensititive display.

18. An apparatus as claimed in claim 16, wherein the at least one memory and the computer program instructions are configured to, with the at least one processor, cause the apparatus at least to perform:

determining a first characteristic of the first image;

analyzing said set to identify an image of said set presenting a second characteristic, different from said first characteristic; and selecting the identified image as the second image.

19. An apparatus as claimed in claim 18, wherein the first and the second characteristics are determined by analyzing a data portion of the first image and a data portion of the second image, respectively.

20. An apparatus as claimed in claim 18, wherein the at least one memory and the computer program instructions are configured to, with the at least one processor, cause the apparatus at least to perform:

determining, for the first image, a first setting of a first parameter of the digital camera and a first setting of a second parameter of the digital camera, said first settings being used when capturing the first image;

and wherein identifying an image of said set presenting a second characteristic includes:

identifying an image of said set which has been captured using the first setting of the first parameter and a second setting of the second parameter.

21. An apparatus as claimed in claim 20, wherein the at least one memory and the computer program instructions are configured to, with the at least one processor, cause the apparatus at least to perform:

determining, for the second image, a first setting of a third parameter of the digital camera being used when capturing the second image;

identifying a third image of said set which has been captured using the first setting of the first parameter, the second setting of the second parameter and a second setting of the third parameter;

providing a tertiary image based on image data of at least the third image of said set; and sending, in response to receiving a further user command, the tertiary image for presentation of a further adjusted representation of the view on the display.

22. A non-transitory, tangible computer readable storage medium comprising instructions configured to control a processor to perform:

determining an initial representation of a view by providing a primary image based on image data of at least a first image of a set of images, wherein the images of said set depict a same view and are captured with a digital camera using different configurations of the digital camera, wherein each configuration comprises specific settings for a set of parameters of the digital camera;

sending the primary image for presentation of the initial representation on a display;

identifying a first subset of images of said set, each image of said first subset being captured using a same setting as the first image for at least one parameter of said set of parameters of the digital camera and a different setting than the first image for at least one capture-related parameter of said set of parameters, and the remaining images of said set, not being images of the first subset, are images of a second subset;

associating each image of said first subset and no images of said second subset with a different user command;

determining the image of said first subset which is associated with a received user command, wherein the determined image is selected as a second image;

providing a secondary image based on image data of at least the selected second image, wherein the first image and the second image are different images; and sending the secondary image for presentation of an adjusted representation of the view on the display.

* * * * *